(12) United States Patent
Johns

(10) Patent No.: US 7,591,497 B2
(45) Date of Patent: Sep. 22, 2009

(54) UTILITY TRAILER

(76) Inventor: Bradley W. Johns, 1250 New Natchitoches Rd., West Monroe, LA (US) 71292

( * ) Notice: Subject to any disclaimer, the term of this patent is extended or adjusted under 35 U.S.C. 154(b) by 457 days.

(21) Appl. No.: 11/386,605

(22) Filed: Mar. 22, 2006

(65) Prior Publication Data
US 2006/0214446 A1 Sep. 28, 2006

Related U.S. Application Data

(60) Provisional application No. 60/664,812, filed on Mar. 25, 2005.

(51) Int. Cl.
*B62D 63/06* (2006.01)
(52) U.S. Cl. ............ 296/3; 296/24.32; 296/26.15; 280/415.1; 280/35; 280/656
(58) Field of Classification Search ............ 296/3, 296/24.32, 24.3, 26.15, 26.1, 61; 280/400, 280/35, 42, 656, 762, 769, 415.1; 83/928, 83/795; 144/286.5
See application file for complete search history.

(56) References Cited

U.S. PATENT DOCUMENTS

| | | | | |
|---|---|---|---|---|
| 3,628,578 | A * | 12/1971 | Berg | 83/471.3 |
| 4,055,206 | A | 10/1977 | Griffin | 144/285 |
| 4,133,572 | A | 1/1979 | Robbins et al. | 296/23 |
| 4,393,969 | A * | 7/1983 | Woell | 193/35 TE |
| 4,516,308 | A | 5/1985 | Urban | 29/564 |
| 4,798,113 | A * | 1/1989 | Viazanko | 83/471.3 |
| 4,852,623 | A * | 8/1989 | Rodrigues | 144/287 |
| 5,320,150 | A * | 6/1994 | Everts et al. | 144/287 |
| 5,383,698 | A * | 1/1995 | Buchholz | 296/26.03 |
| 5,634,681 | A * | 6/1997 | Gionta | 296/3 |
| 5,829,812 | A * | 11/1998 | Gionta | 296/3 |
| 5,964,358 | A * | 10/1999 | Hafendorfer et al. | 211/70.6 |
| 6,345,853 | B1 | 2/2002 | Price, Jr. et al. | 296/24.1 |
| 6,517,134 | B2 | 2/2003 | Armstrong | 296/3 |
| 6,565,165 | B2 | 5/2003 | Switkes | 312/249.13 |
| 6,588,720 | B1 * | 7/2003 | Revette | 248/311.2 |
| 6,644,708 | B1 * | 11/2003 | Grzegorzewski et al. | 296/32 |
| 6,688,197 | B1 * | 2/2004 | Niemela | 83/39 |
| 6,846,003 | B2 * | 1/2005 | Thompson | 280/656 |
| 6,983,953 | B1 * | 1/2006 | Damron | 280/656 |
| 7,080,443 | B2 * | 7/2006 | Dubuc | 29/722 |
| 7,117,702 | B2 * | 10/2006 | Nyssen | 72/49 |
| 7,222,905 | B2 * | 5/2007 | Jaeck | 296/1.07 |
| 2002/0036392 | A1 * | 3/2002 | Damron | 280/656 |
| 2003/0102655 | A1 * | 6/2003 | Thompson | 280/656 |
| 2004/0026472 | A1 * | 2/2004 | Foo et al. | 224/310 |
| 2005/0062309 | A1 * | 3/2005 | Juzwiak et al. | 296/51 |
| 2005/0194215 | A1 * | 9/2005 | Radermacher | 182/181.1 |
| 2007/0132208 | A1 * | 6/2007 | Winter et al. | 280/656 |
| 2007/0272066 | A1 * | 11/2007 | Phillips et al. | 83/435.11 |

* cited by examiner

*Primary Examiner*—Jason S Morrow
(74) *Attorney, Agent, or Firm*—John M. Harrison

(57) ABSTRACT

A utility trailer for transporting and processing lumber, pipe and other materials. The utility trailer includes a trailer frame for carrying the materials and a workstation is pivotally mounted on the trailer frame for processing the materials. The workstation is pivotal between a folded configuration adjacent to the trailer frame for storage and/or transport and a deployed, functional configuration extending from the trailer frame. One or more lockers or cabinets may be provided, with both interior and exterior access. A removable gate may also close the rear end of the utility trailer and a pair of ramps are stored in ramp housings on both sides of the utility trailer for deployment at the rear of the utility trailer.

18 Claims, 8 Drawing Sheets

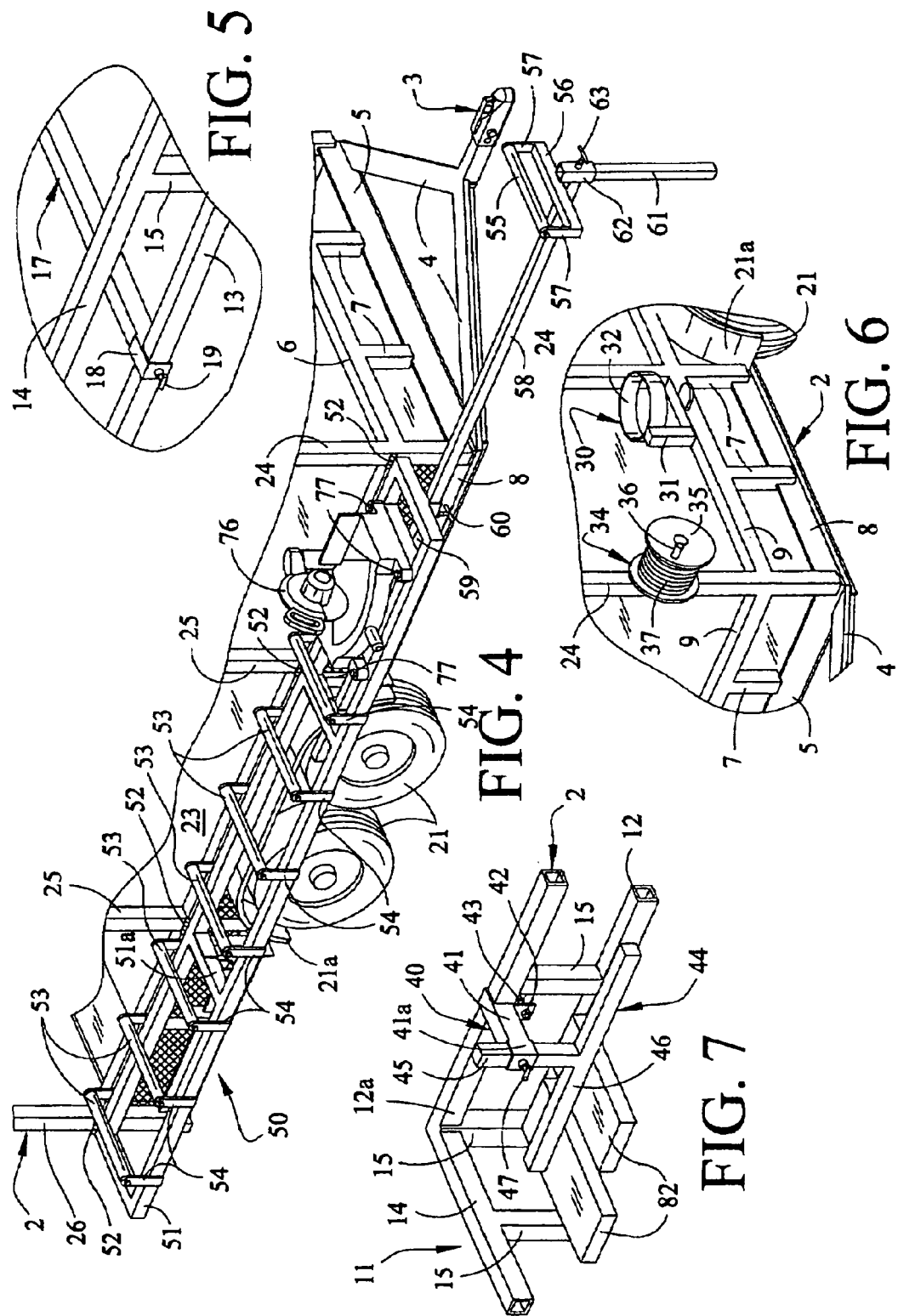

UTILITY TRAILER

CROSS-REFERENCE TO RELATED APPLICATIONS

This application claims the benefit and incorporates by reference U.S. Provisional Application Ser. No. 60/664,812, Filed Mar. 25, 2005.

FIELD OF THE INVENTION

This invention relates to utility trailers and more particularly, to a utility trailer which is fitted with a pivoting or folding workstation that may include an electric saw or other power tool or tools to facilitate various lumber, pipe and other material cutting, handling or processing operations. Lockers or cabinets and a removable rear gate, along with stored ramps are also features of the utility trailer of this invention.

BACKGROUND OF THE INVENTION

Utility trailers are commonly used to transport lumber, plumbing supplies, tools and other construction items and materials to and from construction sites. Typically, utility trailers are fitted with a forwardly-protruding trailer hitch which engages a hitch element provided on the rear of a towing vehicle. The utility trailer typically has a trailer interior and floor in which the lumber, tools, pipe and other supplies and materials are stored during transport and upon arrival at a construction site, the supplies and materials are removed from the trailer as needed. Saws and other tools or workstations are typically removed from the trailer and set up to cut or otherwise process or handle lumber, and other materials. The material-handling devices, saws and other tools or workstations are typically separate from the trailer and must be individually removed from the trailer and set up for use.

SUMMARY OF THE INVENTION

The present invention is generally directed to a utility trailer which in a preferred embodiment, is fitted with a pivoting or folding workstation having a power tool or tools for the cutting, handling or processing of lumber, pipe and other construction material. The workstation may be provided with multiple, linearly-spaced rollers to facilitate feeding the lumber, pipe or other material to a saw or other tool or tools on the workstation. The workstation is capable of being folded and secured against the trailer during transport of the trailer and can be selectively unfolded and deployed while still attached to the trailer, in a functional position for the cutting, handling or processing of materials at a construction site. The utility trailer may further include various other accessories such as a pipe and lumber carrier, water jug holder, extension cord mounts, one or more lockers or cabinets, a removable metal gate and stored ramps, as well as a rotatable cord or cable-dispensing spool, for example.

BRIEF DESCRIPTION OF THE DRAWINGS

The invention will now be described, by way of example, with reference to the accompanying drawings, in which:

FIG. 4 is a right side perspective view of the utility trailer, partially in section, with the workstation deployed in the unfolded, functional position illustrated in FIGS. 1 and 3 and further illustrating forward deployment of an extendible roller from the workstation;

FIG. 5 is an enlarged sectional view of a potion of the trailer frame, illustrating an illustrative technique for mounting an adjustable carrier spacer of a pipe and lumber carrier on the trailer frame;

FIG. 6 is an enlarged sectional view of a typical cord or cable-dispensing spool and water jug holder mounted on the trailer frame;

FIG. 7 is an enlarged sectional view of a typical lumber stabilizer provided on the trailer frame to stabilize lumber during transport on the utility trailer;

DETAILED DESCRIPTION OF THE INVENTION

Figure 1:
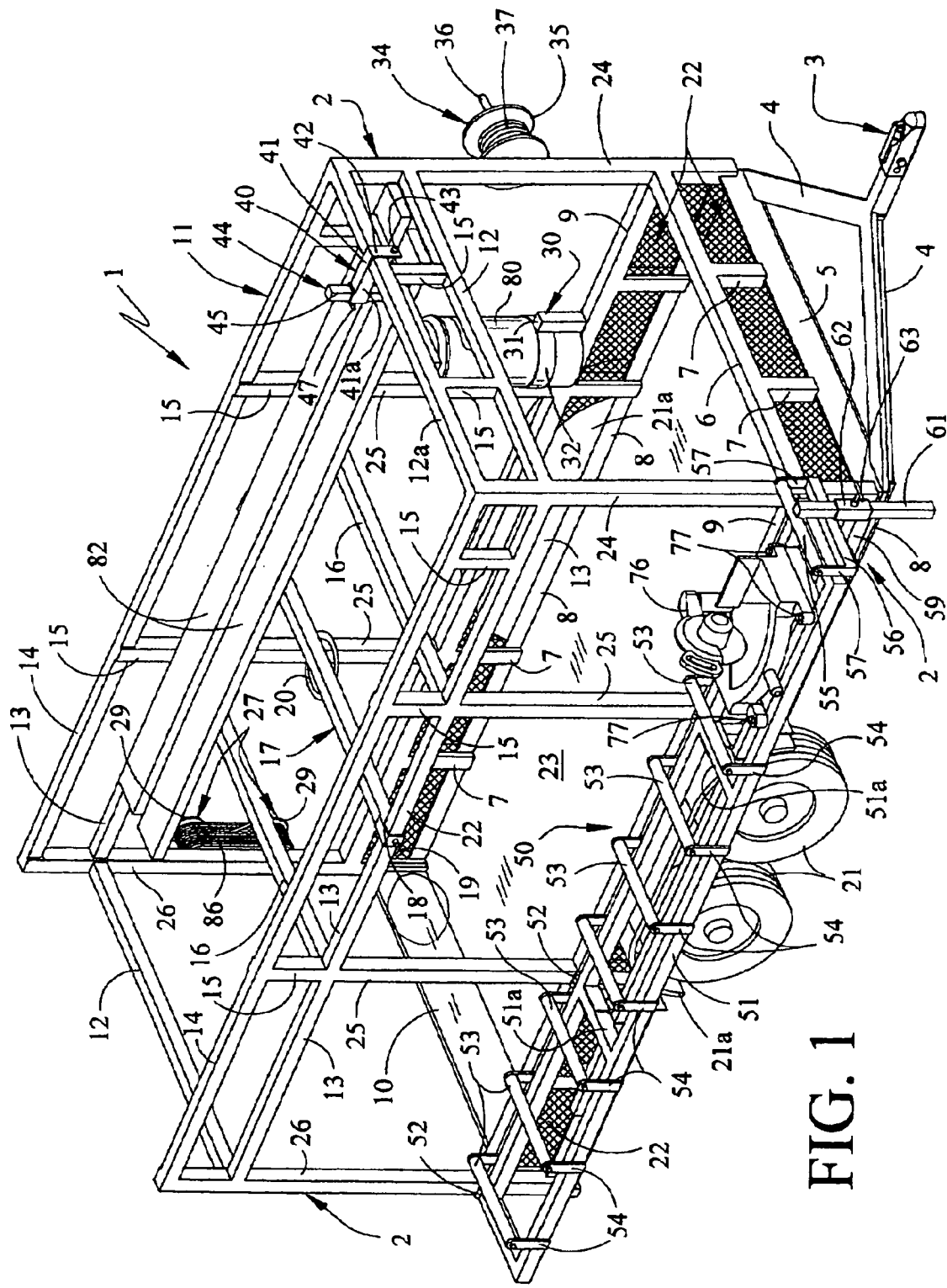
FIG. 1 is a right side perspective view of an illustrative embodiment of the utility trailer of this invention, with a workstation deployed in an unfolded, functional position.
Figure 2:
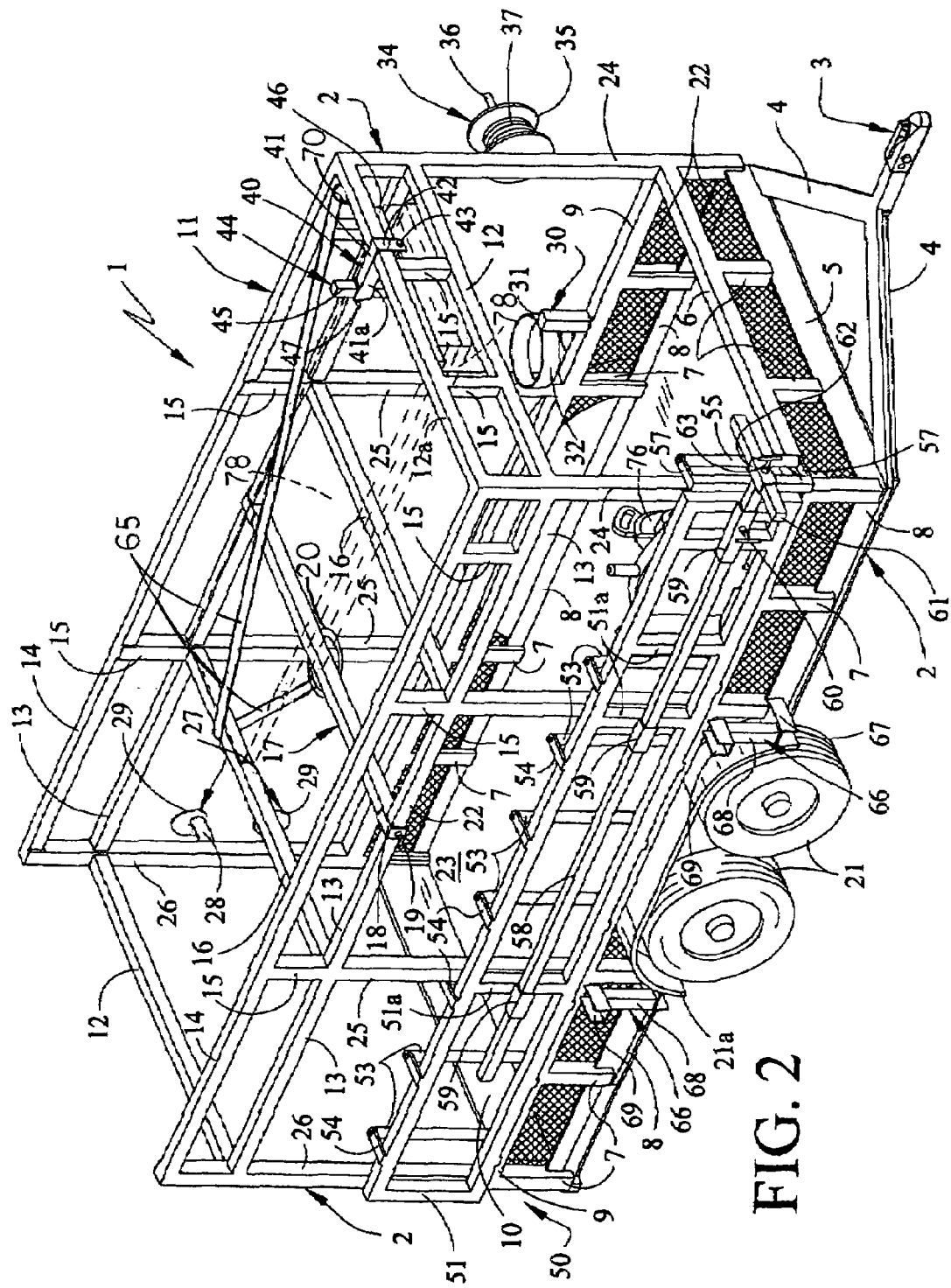
FIG. 2 is a right side perspective view of the utility trailer, with the workstation folded and secured in a non-functional or transport position against the trailer frame.
Figure 3:
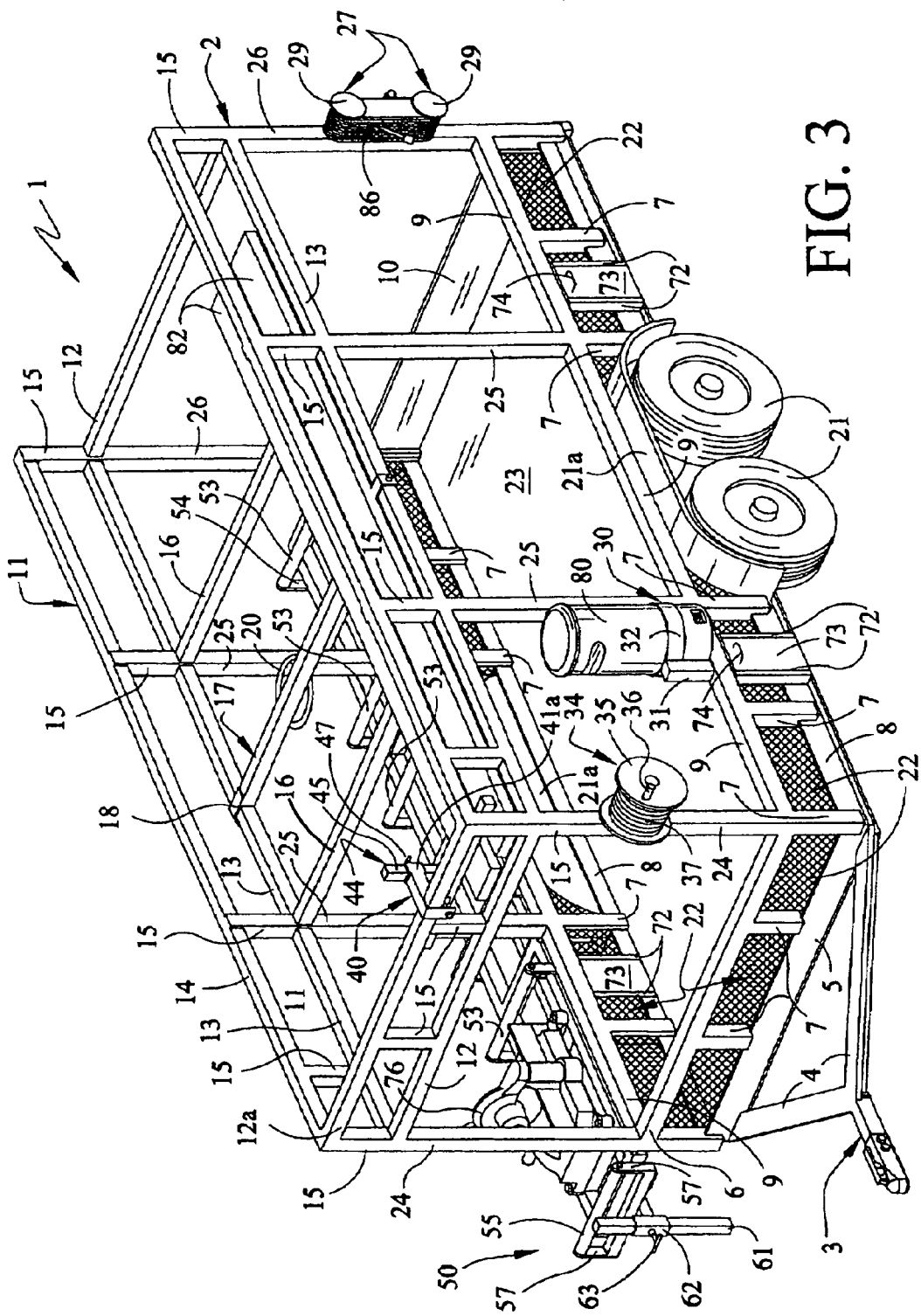
FIG. 3 is a left side perspective view of the utility trailer, with the workstation deployed in the unfolded, functional position illustrated in FIG. 1, more particularly illustrating a rotatable cord or cable-dispensing spool, a water jug holder and extension cord mounts provided on the trailer frame.

Referring to the drawings, an illustrative embodiment of the utility trailer of this invention is generally indicated by reference numeral 1 in FIGS. 1-3. The utility trailer 1 includes a generally elongated, rectangular trailer frame 2 that is rendered portable, typically by trailer wheels 21, the details of which trailer frame 2 will be hereinafter described. It will be understood that the details of the trailer frame 2 and other elements of the utility trailer 1 which will be hereinafter set forth are intended to be descriptive and illustrative only and that the trailer frame 2 and other elements of the utility trailer 1 may have any alternative design or construction which is consistent with the use requirements of the utility trailer 1.

The various structural elements of the trailer frame 2 may be welded steel or aluminum, typically square tubing, for example, as illustrated. The trailer frame 2 typically includes a pair of spaced-apart front vertical frame members 24, two pairs of spaced-apart middle vertical frame members 25 behind the respective front vertical frame members 24 and a pair of spaced-apart rear vertical frame members 26, located behind the respective middle vertical frame members 25. Carrier end runners 12 connect the respective pairs of front vertical frame members 24 and rear vertical frame members 26 to each other. A carrier top runner 12a further connects the upper ends of the front vertical frame members 24 to each other, and multiple vertical carrier runner supports 15 connect the carrier end runner 12 to the carrier top runner 12a at the front end of the trailer frame 2. Multiple carrier bottom side runners 13 connect the front vertical frame members 24 to the respective middle vertical frame members 25, the respective middle vertical frame members 25 to each other, and the rearmost middle vertical frame members 25 to the respective rear vertical frame members 26. Carrier top side runners 14 extend rearwardly from the respective ends of the carrier top runner 12a, above and in parallel relationship to the carrier bottom side runners 13, and each is typically coextensive with the trailer frame 2. On each side of the trailer frame 2, multiple, spaced-apart carrier runner supports 15 connect the carrier bottom side runners 13 to the corresponding carrier top side runners 14.

A front runner 6 connects the front vertical frame members 24 to each other and extends beneath and in parallel relationship to the carrier end runner 12. Top side runners 9 connect the front vertical frame members 24 to the respective middle vertical frame members 25, the respective middle vertical frame members 25 to each other, and the rearmost middle vertical frame members 25 to the respective rear vertical frame members 26, beneath the respective carrier bottom side runners 13. In similar fashion, bottom side runners 8 disposed beneath the top side runners 9 connect the front vertical frame members 24 to the respective middle vertical frame members 25, the middle vertical frame members 25 to each other, and the rearmost middle vertical frame members 25 to the respective rear vertical frame members 26. Runner supports 7 typically connect the bottom side runners 8 to the respective top side runners 9. A wheel well or fender 21 a is mounted typically to each top side runner 9 and between adjacent runner supports 7 on each side of the trailer frame 2 and covers the corresponding pair of adjacent wheels 21. An expanded metal fence 22 is typically mounted between the runner supports 7, the bottom side runners 8 and the top side runners 9 on each side of the trailer frame 2, as well as between the runner supports 7, the hitch mount plate 5 and the front runner 6 on the front end of the trailer frame 2.

A hitch mount plate 5 extends between the lower ends of the front vertical frame members 24, beneath the front runner 6, and multiple runner supports 7 extend between the hitch mount plate 5 and the front runner 6. Two hitch mounts 4 angle forwardly and inwardly toward each other from the respective ends of the hitch mount plate 5 and join at their extending ends. A trailer hitch 3, such as a ball-couple trailer hitch receptacle, for example, extends forwardly from the joining ends of the hitch mounts 4. A rear plate 10 extends between the lower ends of the rear vertical frame members 26. Bottom frame members (not illustrated), which are typically welded or otherwise attached to the trailer frame 2, typically extend between the hitch mount plate 5 and the rear plate 10 and between the bottom side runners 8. A floor panel 23, which is typically wood or metal plate, is supported by these bottom frame members.

A pipe , and lumber carrier 11 may be provided on the trailer frame 2. The pipe and lumber carrier 11 typically includes fixed carrier spacers 16 which extend between the upper ends of the respective pairs of middle vertical frame members 25, in transverse relationship to the longitudinal axis of the trailer frame 2. An adjustable carrier spacer 17 is adjustably mounted on the carrier bottom side runners 13, between and in parallel relationship to the fixed carrier spacers 16. As illustrated in FIG. 5, a spacer bracket 18 attaches each end of the adjustable carrier spacer 17 to the corresponding carrier bottom side runner 13 in adjustable sliding fashion. A spacer bracket adjusting screw 19 is threaded into a screw opening (not illustrated) which extends through each spacer bracket 18. Each spacer bracket adjusting screw 19 can be rotated in the screw opening and tightened against the corresponding carrier bottom side runner 13 to secure the adjustable carrier spacer 17 at a selected position between the fixed carrier spacers 16, for purposes which will be hereinafter described. A spacer bracket tie down ring 20 (FIG. 1) may be provided on the adjustable carrier spacer 17. As will be hereinafter further described, the fixed carrier spacers 16 are capable of supporting lumber 82, sheet metal 78 (illustrated in phantom in FIG. 2), pipe segments, plywood (not illustrated) and/or other materials of various length during transport of the utility trailer 1. The position of the adjustable carrier spacer 17 between the fixed carrier spacers 16 can be adjusted, as needed, to support pieces of lumber, stacks of sheet metal, pipe segments or other materials which are too short to extend across both of the fixed carrier spacers 16. Furthermore, a rope or strap 65, illustrated in FIG. 2, may be attached to the spacer bracket tie down ring 20, extended around a fixed carrier spacer 16 (by way of example) and then around the sheet metal 78 (FIG. 2) or the lumber 82, pipe segments or other material, to a mount bracket 70, to prevent the sheet metal 78, lumber 82, pipe segments or material from inadvertently falling off the pipe and lumber carrier 11 during transport of the utility trailer 1.

The pipe and lumber carrier 11 typically further includes a lumber stabilizer 40 for stabilizing the lumber 82, pipe segments (not illustrated) and/or other material during transport on the fixed carrier spacers 16 and adjustable carrier spacer 17 as the utility trailer 1 is towed by a towing vehicle (not illustrated). As illustrated in FIG. 7, the lumber stabilizer 40 includes a horizontal stabilizer support arm 41, one end of which is welded to or mounted on the carrier top runner 12a of the trailer frame 2, in the latter case, typically by an arm mount bracket 42. An arm mount bolt 43 typically extends through aligned bolt openings (not illustrated) provided in the arm mount bracket 42 to secure the arm mount bracket 42 on the carrier top runner 12a. An inverted T-shaped stabilizer bar 44 engages the stabilizer support arm 41 for selective vertical adjustment thereon. Accordingly, a stabilizer sleeve 41a terminates the extending end of the stabilizer support arm 41. The stabilizer bar 44 includes a vertical member 45 and an elongated horizontal member 46 provided on the lower end of the vertical member 45. The vertical member 45 slidably extends through the stabilizer sleeve 41a. An adjusting bolt 47 is threaded in a bolt opening (not illustrated) provided in the stabilizer sleeve 41a and can be selectively tightened against the vertical member 45 to secure the stabilizer bar 44 at a desired vertical position on the stabilizer support arm 41. Accordingly, when lumber 82, pipe segments (not illustrated) or other material is supported on the fixed carrier spacers 16 and adjustable carrier spacer 17, the stabilizer bar 44 can be positioned downwardly on the stabilizer support arm 41 by loosening the adjusting bolt 47, sliding the horizontal member 45 downwardly in the stabilizer sleeve 41a, until the horizontal member 46 engages the lumber 82, pipe segments or other material, and tightening the adjusting bolt 47 against the horizontal member 45, respectively. Therefore, the stabilizer bar 44 is effective to stabilize the lumber 82 or other material on the trailer frame 2 during towing of the utility trailer 1, as will be hereinafter further described.

As illustrated in FIGS. 1-4 of the drawings, a pivoting or folding workstation 50 is provided on the trailer frame 2 to facilitate various lumber, pipe or other material cutting, handling or processing operations, as will be hereinafter described. The workstation 50 typically includes an elongated, rectangular workstation frame 51 having multiple, spaced-apart frame braces 51 a welded thereto. Multiple sets of frame hinges 52 pivotally mount the workstation frame 51, typically on one side of the trailer frame 2. As illustrated in FIGS. 1 and 4, the sets of frame hinges 52 are typically attached to the front vertical frame members 24, the middle vertical frame members 25 and the rear vertical frame member 26, respectively, or may alternatively be attached to any other suitable structural element or elements of the trailer frame 2. Paired roller supports 54 extend from opposite sides of the workstation frame 51, and fixed rollers 53 are rotatably mounted between the respective pairs of the roller supports 54. The fixed rollers 53 are provided on the workstation frame 51 at spaced-apart intervals with respect to each other. A power saw 76 or other power tool or tools is/are provided on the end portion of the workstation frame 50 for the cutting and/or other processing of lumber 82 (FIG. 1), pipe segments (not illustrated) or other materials as the lumber 82, pipe segment or other material is typically placed and rolled on the fixed rollers 53, toward the power saw 76 or other tool or tools, as will be hereinafter further described. Multiple saw mount bolts 77 are typically extended through saw mounts provided on the power saw 76 and threaded through respective bolt openings (not illustrated) provided in the workstation frame 51 to secure the power saw 76 to the workstation frame 51.

As illustrated in FIG. 2, a pair of frame supports 66 is typically provided on the trailer frame 2 for supporting the workstation 50 when it is in the unfolded, functional position of FIG. 1. The frame supports 66 are typically provided on opposite sides of the wheel wells 21a, and each typically includes a horizontal member 67 which extends generally horizontally from the bottom side runner 8 and a vertical member 68 which extends generally upwardly from the horizontal member 67. A support bracket 69 is provided on the upper end of each vertical member 68. Accordingly, when the workstation 50 is disposed in the lowered, unfolded or functional position of FIG. 1, the support brackets 69 receive respective frame braces 51a on the workstation frame 51 and support the workstation 50 in the horizontal or functional position above the ground.

As illustrated in FIGS. 1 and 2, the workstation 50 is typically fitted with a workstation support leg 61 which, when the workstation 50 is deployed in the functional position, rests on the ground (not illustrated) and, in conjunction with the frame supports 66 (FIG. 2), supports the workstation 50 in the unfolded, functional position of FIG. 1 when in use, as will be hereinafter described. As illustrated in FIGS. 2 and 4, multiple support bar sleeves 59 are provided on the bottom surfaces of the respective frame braces 51a of the workstation frame 50. An elongated workstation support bar 58 slidably extends through the support bar sleeves 59. A support bar adjusting bolt 60 is threadably mounted in an opening (not illustrated) provided in one of the support bar sleeves 59 and can be selectively threaded in the opening and tightened against the workstation support bar 58 to prevent sliding of the workstation support bar 58 in the support bar sleeves 59. A leg adjusting sleeve 62 terminates the extending end of the workstation support bar 58, and a workstation support leg 61 slidably extends through the leg adjusting sleeve 62. A bolt opening (not illustrated) extends through the leg adjusting sleeve 62, and a leg adjusting bolt 63 is threaded in the bolt opening and can be selectively threaded against the workstation support leg 61 to secure the workstation support leg 61 against further sliding movement in the leg adjusting sleeve 62. Accordingly, the workstation frame 51 can be supported in the unfolded, lowered or functional configuration at a desired height above the ground and carries an extendible roller 55, as illustrated in FIG. 1, by sliding the workstation support leg 61 in the leg adjusting sleeve 62 and then tightening the leg adjusting bolt 63 against the workstation support leg 61.

As further illustrated in FIG. 4, an elongated roller mount bar 56, from which extends a pair of parallel, spaced-apart roller supports 57, may be provided on the extending end segment of the workstation support bar 58. The extendible roller 55 is rotatably mounted between the roller supports 57. Accordingly, the extendible roller 55 can be positioned a selected distance from the power saw 76 and/or other tool or tools by loosening the support bar adjusting bolt 60 (FIG. 2), sliding the workstation support bar 58 from the workstation frame 51 through the support bar sleeves 59, and tightening the support bar adjusting bolt 60 against the workstation support bar 58, respectively.

A pair of extension cord mounts 27 may be provided on the trailer frame 2, typically in vertically-spaced apart relationship to each other. As illustrated in FIGS. 2 and 3, each extension cord mount 27 typically includes a mount arm 28 which extends from one of the vertical frame elements of the trailer frame 2, such as one of the rear vertical frame members 26, for example, as illustrated. A circular mount plate 29 is provided on the extending end of each mount arm 28. Accordingly, as illustrated in FIGS. 1 and 3, an electrical extension cord 86 can be wound on the mount arms 28 of the respective extension cord mounts 27, such that the respective mount plates 29 prevent the extension cord 86 from inadvertently slipping off the mount arms 28, to store the extension cord 86 for ultimate use at the construction site or other destination of the utility trailer 1.

As illustrated in FIGS. 3 and 6 of the drawings, a water jug holder 30 may be welded, bolted or otherwise provided on the trailer frame 2, such as on one of the top side runners 9, for example, as illustrated. The water jug holder 30 typically includes a holder arm 31 which extends upwardly from the top side runner 9 and a circular holder ring 32 which is mounted on the holder arm 31. The holder ring 32 is configured for receiving and holding a water jug 80, as illustrated in FIG. 3, at a construction site or other destination of the utility trailer 1.

As further illustrated in FIGS. 3 and 6, a cord or cable-dispensing spool 34 may also be provided on the trailer frame 2, such as on one of the front vertical frame members 24, for example, as illustrated. The cord or cable-dispensing spool 34 typically includes a spool drum 35 which is rotatably mounted on the front vertical frame member 24, as illustrated, or other element of the trailer frame 2, typically by means of a bolt (not illustrated) or otherwise, according to the knowledge of those skilled in the art. A spool handle 36 extends from the spool drum 35, offset from the centerpoint thereof, to facilitate manual rotation of the spool drum 35. Accordingly, an extension cord, wiring, cable or the like 37 can be wound on the spool drum 35 by rotating the spool drum 35 in one direction and selectively and incrementally dispensed from the spool drum 35 by pulling the loose end of the cord, wiring or cable from the rotating spool drum 35 or by rotating the spool drum 35 in the opposite direction using the spool handle 36.

As further illustrated in FIG. 3 of the drawings, on one or both sides of the trailer frame 2, at least one slot frame 72 extends typically between one or more of the bottom side runners 8 and top side runners 9. A slot opening (not illustrated) extends through the slot frame 72. A slot door 73, typically fitted with a handle 74, slidably engages the slot frame 72. Accordingly, the slot door 73 can be raised on the slot frame 72 and removed to expose the slot opening, after which a strap, rope, cord or the like (not illustrated) maybe extended through the slot opening and tied to the trailer frame 2 to attach or tether various items to the trailer frame 2 as they are carried in the utility trailer 1, for example.

Figure 12:
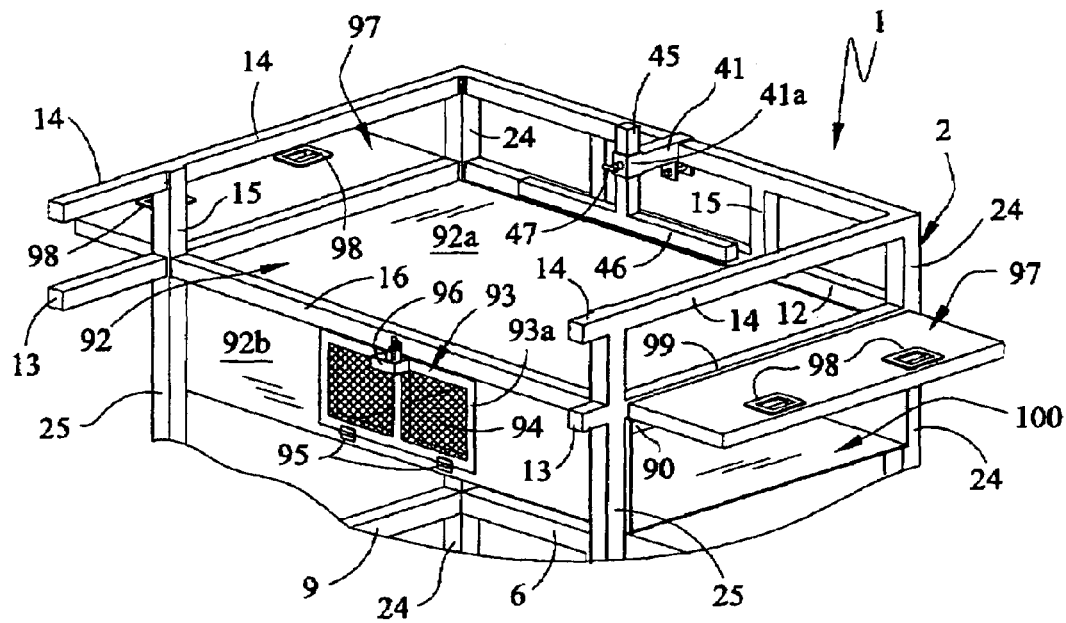
FIG. 12 is a perspective view, partially in section, of the frontal portion of the trailer frame, more particularly illustrating a storage cabinet or locker having open exterior side doors and a closed interior door.
Figure 13:
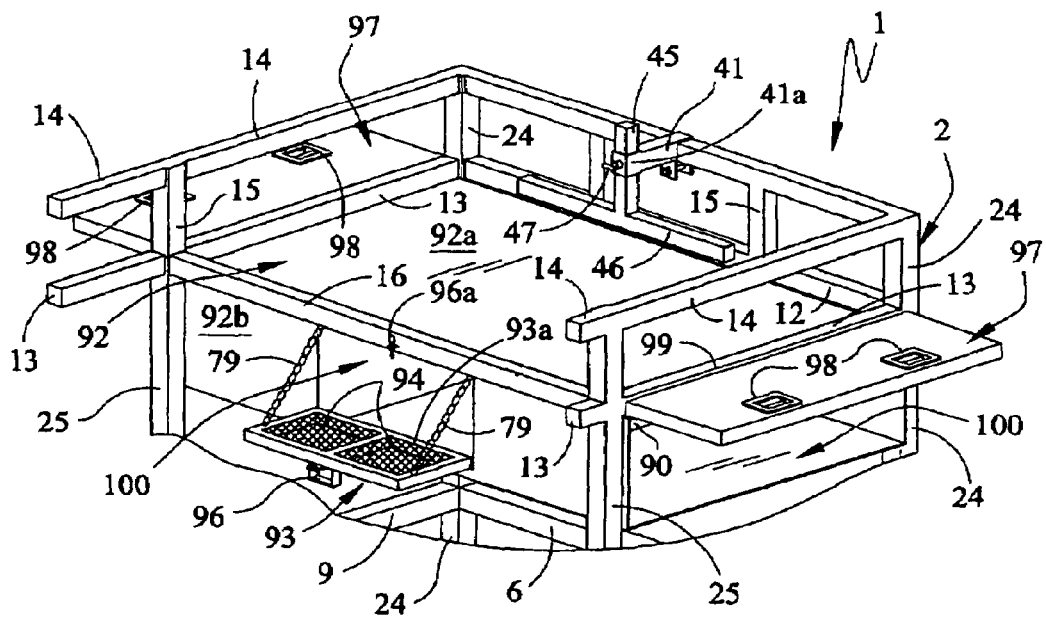
FIG. 13 is a perspective view, partially in section, of the storage cabinet illustrated in FIG. 12, with the interior door open.

Referring now to FIGS. 8-13 of the drawings, in another embodiment of the invention the utility trailer 1 is characterized by a storage locker or cabinet 92, having a cabinet top 92a, typically lying adjacent to the parallel carrier bottom side runners 13, the forward fixed carrier spacer 16 and the corresponding carrier end runner 12, as illustrated. A cabinet front 92b faces rearwardly of the utility trailer 1 and typically receives an interior cabinet door 93, which is characterized by an interior cabinet door frame 93a, fitted with expanded metal 94 therein for viewing the contents of the cabinet interior 100 when the interior cabinet door 93 is closed, as illustrated in FIG. 12. Cabinet door hinges 95 serve to connect the interior cabinet door 93 to the cabinet front 92b at the bottom, as further illustrated in FIG. 12. A cabinet handle 96 is typically provided on the top edge of the interior cabinet door frame 93a and a handle latch 96a is provided on the fixed carrier spacer 16 for securing the interior cabinet door 93 in closed configuration, as further illustrated in FIG. 12. Under circumstances where the cabinet door 93 is opened on the spaced-apart cabinet door hinges 95, parallel chains 79 typically serve to prevent the interior cabinet door 92 from opening past the horizontal configuration illustrated in FIG. 13. In a typical application, the chains 79 extend from attachment to the sides of the interior cabinet door frame 93 to the cabinet front 92b of the storage cabinet 92.

A pair of exterior cabinet doors 97 are typically provided on the outside walls of the storage cabinet 92 as further illustrated in FIGS. 8-13. Each of the exterior cabinet doors 97 is typically characterized by a pair of cabinet door closures 98, which are spaced-apart on the exterior cabinet doors 97, respectively, and a cabinet door hinge 99, typically in the design of a piano hinge, serves to connect the top edge of each of the exterior cabinet doors 97 to the storage cabinet 92. The cabinet door hinges 99 serve to facilitate opening of the exterior cabinet doors 97 to access the cabinet interior 100, as further illustrated in FIGS. 12 and 13 of the drawings. In a preferred embodiment of the invention the cabinet interior 100 is compartmentalized, utilizing the partitions 90 illustrated in FIGS. 12 and 13 to facilitate separation of selected items from other items stored in the cabinet interior 100 which is accessed by the interior cabinet door 93. Alternatively, it will be appreciated that the partitions 90 can be removed and the entire cabinet interior 100 accessed as a single storage area by the interior cabinet door 93 and both of the exterior cabinet doors 97, as desired.

Referring again to FIGS. 8-11 of the drawings, in a preferred aspect of this embodiment of the invention, a pair of ramp housings 88 are provided transversely to the rear longitudinal axis of the utility trailer 1 for receiving a pair of corresponding ramps 87, having ramp spacers 89 (FIG. 11) to facilitate loading of vehicles such as an all-terrain vehicle or the like, onto the floor panel 23 of the utility trailer 1. Access of such a vehicle into the utility trailer 1 is provided by removing the expanded metal gate 83 from a corresponding, oppositely-disposed, spaced-apart gate tracks 81 attached to the corresponding rear vertical frame members 26. In a typical gate design, the expanded metal gate 84 includes a gate frame 85, which is strengthened by a pair of spaced-apart gate frame supports 84 and designed to slide within the gate tracks 81 for removable attachment to the rear end of the utility trailer 1 above the rear plate 10, as further illustrated in FIGS. 10 and 11 of the drawings.

As further illustrated in FIGS. 8-11 of the drawings, a pair of strap anchors 64 are provided on each side of the trailer frame 2 for receiving straps, cords or the like and extending the straps or cords either over the pipe and lumber carrier 11, or between the respective carrier top side runners 14 and carrier bottom side runners 13 to further secure lumber 82, pipe or other supplies, including plywood, drywall and the like on the pipe and lumber carrier 11.

In typical application of the various embodiments of the utility trailer 1 heretofore described, the trailer hitch 3 is coupled to a hitch ball (not illustrated) which is provided on the rear end of a towing vehicle (not illustrated), typically in conventional fashion. The workstation 50 is secured in the folded, vertical or non-functional position illustrated in FIGS. 2 and 8, typically using a latch mechanism (not illustrated) or straps or bungee cords (not illustrated), for example. Various construction supplies, items or materials, such as lumber 82, pipe segments (not illustrated) or the like, are loaded on the floor panel 23 inside the utility trailer 1. Additionally or alternatively, elongated materials such as the lumber 82 or pipe segments (not illustrated) may be loaded on the pipe and lumber carrier 11 by resting the lumber 82, pipe segments (not illustrated) and/or other materials on the fixed carrier spacers 16 and the adjustable carrier spacer 17. In the event that the length of the lumber 82 or other material is insufficiently long to span both of the fixed carrier spacers 16, the position of the adjustable carrier spacer 17 between the fixed carrier spacers 16 can be adjusted as necessary to support the lumber 82 or other material in conjunction with the front fixed carrier spacer 16. This is accomplished typically by loosening the spacer bracket adjusting screws 19 (FIG. 5) on the spacer brackets 18 at the respective ends of the adjustable carrier spacer 17, sliding the spacer brackets 18 along the respective carrier bottom side runners 13, and re-tightening the spacer bracket adjusting screws 19 against the respective carrier bottom side runners 13. As illustrated in FIG. 7, the lumber stabilizer 40 can be adjusted to engage the lumber 82, pipe segments or other material by loosening the adjusting bolt 47, initially sliding the vertical member 45 of the stabilizing bar 44 upwardly in the stabilizer sleeve 41a, sliding the lumber 82 or other material under the horizontal member 46, lowering the horizontal member 46 against the lumber 82, pipe segments or other material, and re-tightening the adjusting bolt 47 against the vertical member 45 of the stabilizer bar 44. Accordingly, the lumber stabilizer 40 engages the lumber 82, pipe segments or other material and prevents the lumber 82 or other material from inadvertently sliding off the trailer frame 2 during towing of the utility trailer 1. Prior to towing of the utility trailer 1, one or more of the slot doors 73 (FIG. 3) can be removed from the slot frame 72 to expose the frame slot (not illustrated) in the slot frame 72 and facilitate extending a rope, cord or strap (not illustrated) through the frame slot and tying the rope, cord or strap to the trailer frame 2 in order to secure materials or items (not illustrated) in the trailer frame 2 during towing of the utility trailer 1.

Figure 8:
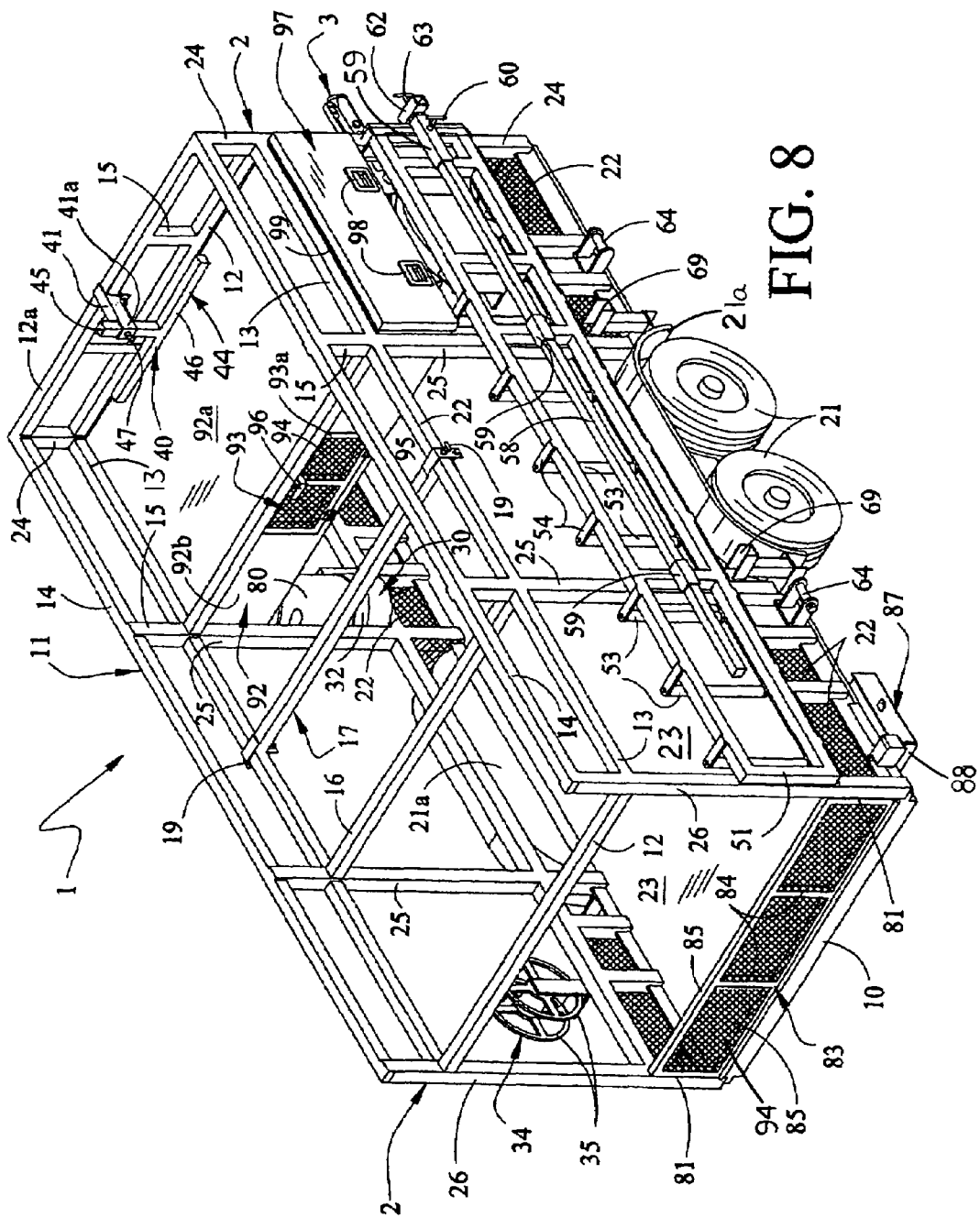
FIG. 8 is a right side perspective view of another illustrative embodiment of the utility trailer of this invention, more particularly illustrating a storage cabinet, removable gate and ramp storage configurations.
Figure 9:
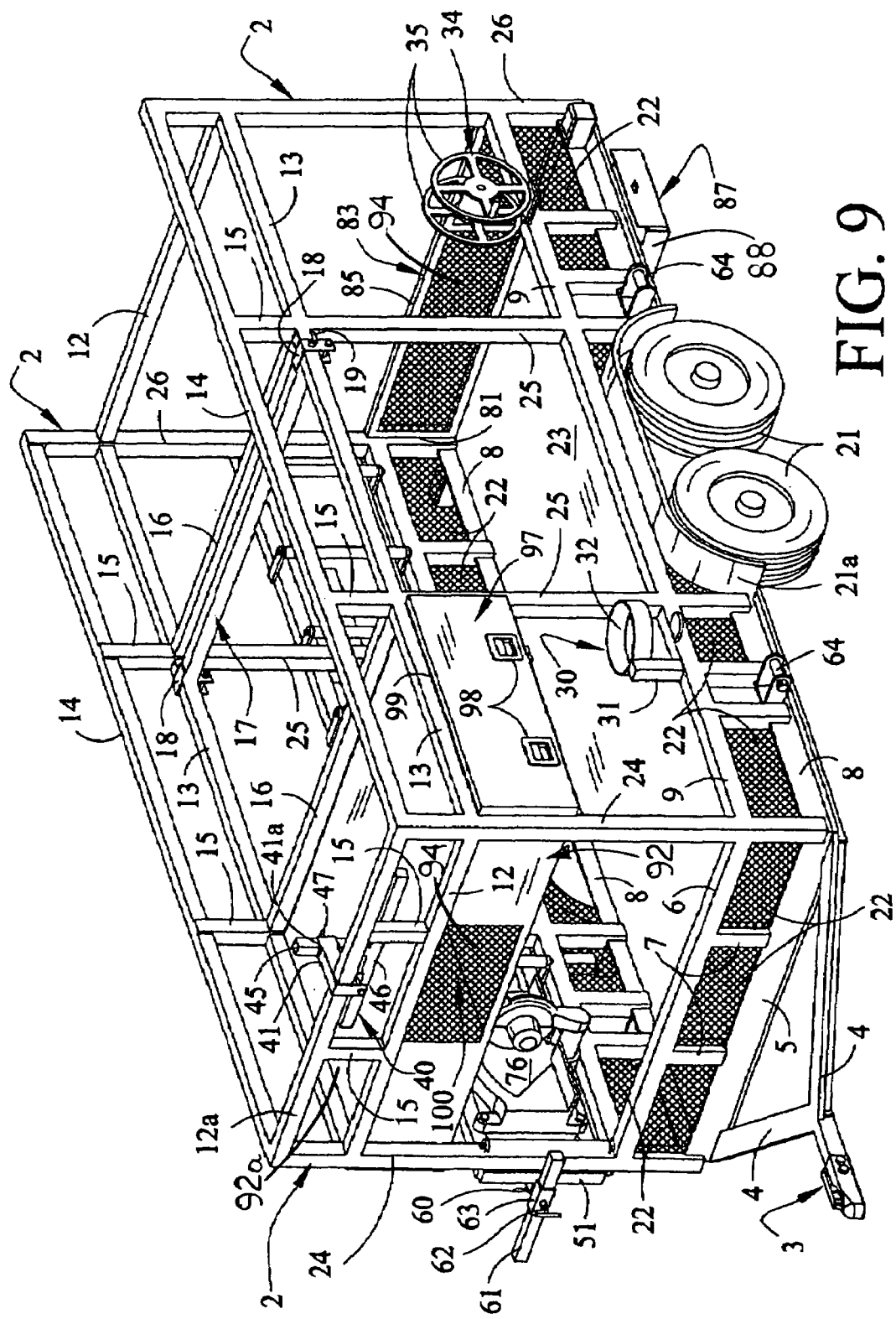
FIG. 9 is a left side perspective view of the utility trailer illustrated in FIG. 8.
Figure 10:
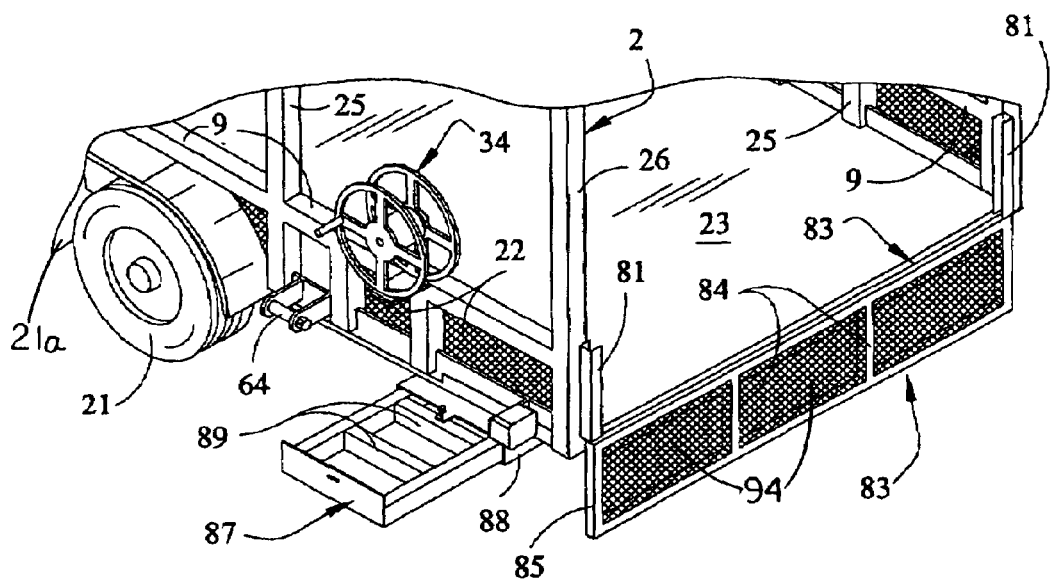
FIG. 10 is a perspective view, partially in section, of the utility trailer illustrated in FIGS. 8 and 9, more particularly illustrating a typical removable gate and ramp configuration.
Figure 11:
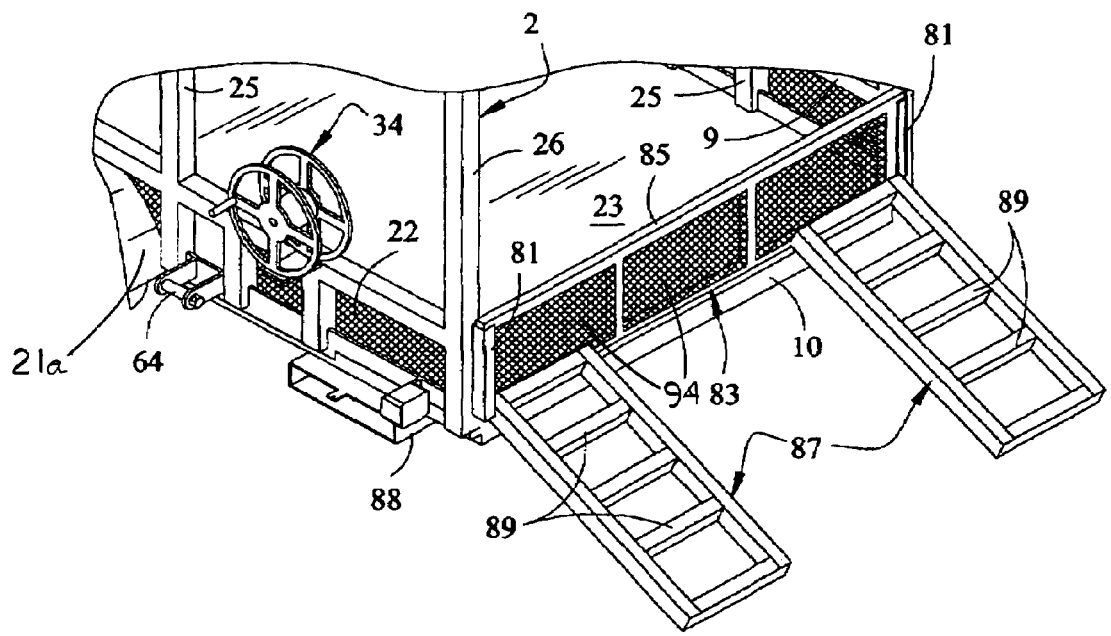
FIG. 11 is a perspective view, partially in section, of the utility trailer illustrated in FIG. 10, with a pair of ramps illustrated in functional configuration.

As the utility trailer 1 is towed to a construction or other site or destination, the workstation 50 is maintained in the folded, raised, non-functional or transport position illustrated in FIGS. 2 and 8 typically by a suitable latch mechanism or by bungee cords or straps, (not illustrated), as heretofore described. After arrival of the utility trailer 1 at the construction site or other destination, the workstation 50 can be unsecured from the trailer frame 2 by disengaging the latch mechanism or removing the bungee cords or straps and then pivoted or unfolded from the trailer frame 2 to rest in the lowered, functional or horizontal position of FIG. 1. Accordingly, the frame braces 51a of the workstation frame 50 are lowered to rest in the respective support brackets 69 (FIG. 2) of the frame supports 66. To facilitate additionally supporting the workstation frame 51 on the ground, the workstation support leg 61 is slidably adjusted vertically in the leg adjusting sleeve 62 by loosening and then tightening the adjusting bolt 63. As illustrated in FIG. 4, the workstation support bar 58 may be selectively extended from the support bar sleeves 59 (FIG. 2) and secured, using the support adjusting bolt 60, to position the extendible roller 55 a selected distance from the power saw 76 or other tool or tools on the workstation frame 51, as deemed necessary to support cut or otherwise processed pieces of the lumber 82, pipe segments or other material after being cut by the power saw 76 or otherwise processed by other tool or tools on the workstation 50. For example, when the workstation 50 is deployed in the functional position illustrated in FIGS. 1, 3 and 4 the lumber 82 (FIG. 1), pipe segments (not illustrated) or other materials can be removed from the pipe and lumber carrier 11 and/or the interior of the utility trailer 2, placed on the fixed rollers 53 at the loading end of the workstation 50 and rolled toward and through the power saw 76 as the power saw 76 is operated to cut segments of the lumber 82, pipe segments or other material. The cut segments of the lumber 82, pipe segments or other material can then be rolled off of the discharge end of the workstation 50 on the extendible roller 55, as desired.

As illustrated in FIGS. 1 and 3, an electrical extension cord 86 can be wound on the extension cord mounts 27 provided on the trailer frame 2 preparatory to transport of the utility trailer 1. At the construction site or other destination, the extension cord 86 can be unwound from the extension cord mounts 27 and used to connect an electrical tool (not illustrated) to an electrical outlet (not illustrated) at the site or destination, for example. Alternatively or additionally, a cord or cable 37, which may be an electrical extension cord, electrical wiring or a utility cable, for example, may be wound on the spool drum 35 of the cord or cable-dispensing spool 34 for storage during transport of the utility trailer 1, typically by attaching one end of the cord or cable 37 to the spool drum 35 and rotating the spool drum 35 using the handle 36. At the construction site or other destination, the cord or cable 37 can be unwound from the spool drum 35, as needed, typically by pulling the free end of the cord or cable 37 from the rotating spool drum 35 or by rotating the spool drum 35 using the handle 36. Furthermore, a water jug 80 can be placed and carried in the holder ring 32 of the water jug holder 30 preparatory to transport of the utility trailer 1 or may be placed in the water jug holder 30 for use at the construction site or other destination.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, I claim:

1. A utility trailer for transporting and processing materials, comprising:
    a trailer frame for carrying the materials;
    a workstation frame pivotally carried by said trailer frame and at least one tool carried by said workstation frame for processing the materials and a plurality of rollers carried by said workstation frame for conveying the materials on said workstation to the tool; and
    a workstation support bar slidably carried by said workstation frame, a workstation support leg slidably mounted on one end of said workstation support bar and an extendible roller mounted on said workstation support bar, wherein said extendible roller is selectively extended from said plurality of rollers for supporting the material, responsive to extension of said workstation support bar in said workstation frame and downward deployment of said workstation support leg.

2. The utility trailer of claim 1 wherein said at least one tool comprises a saw.

3. The utility trailer of claim 1 comprising at least one pair of extension cord mounts provided on said trailer frame.

4. The utility trailer of claim 1 comprising at least one water jug holder carried by said trailer frame.

5. The utility trailer of claim 1 comprising at least one cord or cable-dispensing spool carried by said trailer frame.

6. The utility trailer of claim 1 comprising a pipe and lumber carrier carried by said trailer frame for carrying the materials on said trailer frame.

7. The utility trailer of claim 6 wherein said pipe and lumber carrier comprises at least one fixed carrier spacer carried by said trailer frame and at least one adjustable carrier spacer adjustably carried by said trailer frame adjacent to said at least one fixed carrier spacer.

8. The utility trailer of claim 7 comprises at least one lumber stabilizer carried by said trailer frame for stabilizing the materials on said pipe and lumber carrier.

9. The utility trailer of claim 1 comprising at least one storage locker or cabinet provided on said trailer frame.

10. The utility trailer of claim 9 comprising at least one interior cabinet door and at least one exterior cabinet door provided on said locker or storage cabinet for accessing the interior of said storage cabinet.

11. A utility trailer for transporting and processing materials, comprising:
    a wheeled trailer frame for carrying the materials;
    a workstation comprising an elongated, generally rectangular workstation frame pivotally carried by said trailer frame for processing the materials and a plurality of fixed rollers carried by said workstation frame, said workstation frame pivotal between a folded configuration adjacent to said trailer frame and a deployed configuration extending from said trailer frame;
    a lumber stabilizer provided on said trailer frame, said lumber stabilizer comprising a stabilizing support arm slidably carried by said trailer frame and a vertical member slidably disposed in said stabilizing support arm for contacting and securing lumber placed on said trailer frame; and
    a workstation support bar slidably carried by said workstation frame, a workstation support leg slidably mounted on one end of said workstation support bar and an extendible roller mounted on said workstation support bar, wherein said extendible roller is selectively extended from said plurality of rollers for supporting the material responsive to extension of said workstation support bar in said workstation frame and downward deployment of said workstation support leg.

12. The utility trailer of claim 11 comprising a floor panel provided on said trailer frame and at least one ramp housing provided on said trailer frame beneath said floor panel and a ramp slidably disposed in said ramp housing.

13. The utility trailer of claim 12 comprising a removable gate carried by said trailer frame for accessing the utility trailer.

14. The utility trailer of claim 13 comprising at least one storage cabinet provided on said trailer frame.

15. The utility trailer of claim 14 comprising at least one interior cabinet door and a pair of exterior cabinet doors provided on said storage cabinet for accessing the interior of said storage cabinet and an extendible roller carried by said workstation support bar.

16. A utility trailer for transporting and processing materials, comprising:
   a wheeled trailer frame for carrying the materials;
   a workstation comprising an elongated, generally rectangular workstation frame pivotally carried by said trailer frame, a plurality of fixed rollers carried by said workstation frame and at least one tool carried by said workstation frame for processing the materials, said workstation frame pivotal between a folded configuration adjacent to said trailer frame and a deployed configuration extending from said trailer frame;
   a workstation support bar extendible from said workstation frame;
   a workstation support leg adjustably carried by said workstation support bar for supporting said workstation frame at a selected height in said deployed configuration;
   an extendible roller carried by said workstation support bar; and
   a storage cabinet carried by said trailer frame.

17. The utility trailer of claim 16 comprising:
   a pipe and lumber carrier provided on said trailer frame for carrying the materials, said pipe and lumber carrier comprising a plurality of fixed carrier spacers carried by said trailer frame; an adjustable carrier spacer carried by said trailer frame adjacent to said plurality of fixed carrier spacers; and a lumber stabilizer carried by said trailer frame for stabilizing the materials on said pipe and lumber carrier;
   a floor panel provided on said trailer frame;
   a pair of ramp housing provided in said trailer frame and a ramp slidably carried by each of said ramp housings; and
   a gate removably carried by said trailer frame for accessing the utility trailer.

18. The utility trailer of claim 17 comprising at least one of a pair of extension cord mounts, a water jug holder and a cord or cable-dispensing spool carried by said trailer frame.

* * * * *